No. 610,321. Patented Sept. 6, 1898.
T. DAVEY.
PIPE COUPLING.
(Application filed June 4, 1897. Renewed May 21, 1898.)
(No Model.)
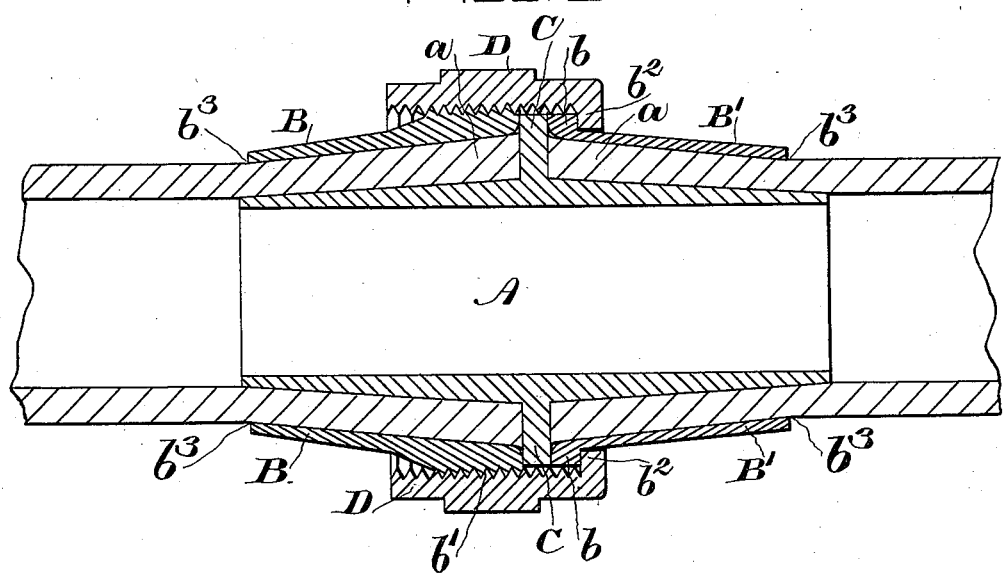

UNITED STATES PATENT OFFICE.

THOMAS DAVEY, OF LYNN, MASSACHUSETTS, ASSIGNOR TO THE PLUMBER'S METALLIC JOINT COMPANY, OF MAINE.

PIPE-COUPLING.

SPECIFICATION forming part of Letters Patent No. 610,321, dated September 6, 1898.

Application filed June 4, 1897. Renewed May 21, 1898. Serial No. 681,359. (No model.)

*To all whom it may concern:*

Be it known that I, THOMAS DAVEY, a citizen of the United States, residing at Lynn, in the county of Essex and State of Massachusetts, have invented certain new and useful Improvements in Pipe-Couplings; and I do hereby declare the following to be a full, clear, and exact description of the invention, such as will enable others skilled in the art to which it appertains to make and use the same.

The present invention relates generally to pipe-couplings, and more particularly to that class of couplings used to unite sections of lead or copper pipe or pipe made of other relatively-malleable material in which it has been proposed to form a lap-joint connection of the pipes which will be secure and water-tight without the aid of solder.

It has heretofore been proposed in the prior art to form such a coupling by means of a tapered interior bushing inserted in the end of the pipe and a tapered retaining-sleeve surrounding the pipe and a clamping-collar to set the sleeve to clamp the section of pipe between the sleeve and bushing, a typical device of this class being shown and described in patent to H. Guyer, dated September 19, 1876, No. 182,435. It will be noted that in said patented device, and in so far as I am advised in all devices shown in the patented art, the section of pipe at which the greatest compression is effected and which forms the sealing-section is a relatively narrow section generally at or substantially at the end of the pipe, which renders it difficult if not impractical to secure a strong and tight joint, particularly where the joint is subjected to marked changes in temperature, as in the worm of a still and various other uses in the arts.

The object of the present invention is to overcome the objection above noted; and to such end it consists of an improved form and arrangement of the interior bushing and retaining-sleeve whereby the section of greatest compression of the pipe or sealing section is removed from the end thereof and located at or near the outer end of the retaining-sleeve, such arrangement tending to force a portion of the metal in the pipe forward as the sleeve is being set and thus to expand the end sections between the bushing and the sleeve, thus forming a broad sealing-section and a tight and strong joint.

The accompanying drawings illustrate my invention as applied to a coupling for two sections of pipe of material of substantially the same degree of malleability.

Figure 1 is a longitudinal section through a coupling embodying the same; and Fig. 2 is a detached view of the tapered bushing, shown in side elevation.

Similar letters of reference represent similar parts throughout the accompanying drawings.

In the drawings, A represents a tapered bushing the exterior walls of which [are tapered longitudinally from the center outward toward each end. It may be said in this connection that the bushing A, as shown in the drawings, is adapted to unite two sections of lead pipe or copper pipe or other pipe of malleable material. When the coupling is used to unite lead and iron pipes, the tapered section at one side of the center may be removed and a suitable device for retaining the iron pipe may be substituted therefor, the present invention being equally applicable to forms of coupling having a single tapered sleeve and a bushing with but one tapered section.

B and B' represent what I have herein termed the "tapered retaining-sleeves," within which the ends of the pipe to be united are inserted and which are drawn up over the same to coöperate with the bushing A in firmly gripping the pipe. The bushing A is conveniently provided with a central collar or flange C, which projects beyond the surface of the pipe, and against which the sleeves B and B' abut when drawn up to the limit of their movement.

As shown in the drawings, the sleeve B' is provided with a flange $b$ at or near its inner end, and the sleeve B is provided with a cylindrical threaded portion $b'$, also adjacent its inner end.

A clamping-collar D is provided, which has an inwardly-projecting flange $b^2$, which engages the flange $b$ in the sleeve B', the collar D being interiorly threaded to engage the cylindrical threaded portion $b'$ of the sleeve B and the arrangement being such that by rotating the collar D the sleeves B and B' are caused to approximate each other and set to coöperate with the bushing A to firmly grip the pipe.

I desire to say in this connection that I do not claim that the arrangement of the sleeves B and B' and collar D, last-above described, is in itself a part of my invention, as such means of approximating the sleeves B and B' is substantially shown in said patent to Guyer, and I wish to be understood as in no way limiting my invention thereto.

The gist of the present invention consists in the relative inclination of the exterior wall of the bushing A and the interior wall of the sleeve B, (or B',) which causes the sleeve B (or B') to bite the metal adjacent to its outer end and expand it into the space between the sleeve and the bushing A, as before stated. As shown in the drawings, I effect this result by forming the sleeves B and B' with a tapered inner wall and the bushing A with a tapered exterior wall and forming the interior walls of the sleeves B B' with a relatively-greater taper than the exterior wall of the bushing A, said walls converging toward each other and tapering toward the medial or axis line of the pipe and away from the abutting ends thereof. The above-described arrangement is such that it causes the sleeves to compress the pipe to the greatest extent along a section substantially at $b^3$, and as the sleeves B and B' are drawn together a portion of the metal of the pipe will be forced toward the end thereof and will tend to expand the sections in advance of $b^3$ "swelling," so to speak, the wall of the pipe, substantially as shown at $a$, and thus insuring a broad sealing-section and strong tight joint. It is of course understood that the sleeves B B' and the bushing A are made of a relatively hard metal—such, for example, as cast-iron or brass—as is usual in devices of this kind.

I am aware that in the patent to Peterson, No. 475,704, dated May 24, 1892, a device is shown in which the sealing-section is removed from the abutting ends of the sections of pipe; but such device does not embody a bushing and sleeve the adjacent walls of which converge toward each other, and a very narrow sealing-section is obtained, no advantage being gained from the material between the sealing-section and the end of the pipe.

Having thus described my invention, I desire to secure by Letters Patent of the United States—

In a pipe-coupling the combination, with suitable clamping means, of a bushing and sleeve, the outer wall of the bushing and inner wall of the sleeve tapering toward the medial line of the pipe, and converging toward each other throughout their tapered portions, in a direction from the middle of the coupling, substantially as described.

In testimony whereof I affix my signature in presence of two witnesses.

THOMAS DAVEY.

Witnesses:
JAMES H. SISK,
FRED P. SNOW.